Figures 1, 2:
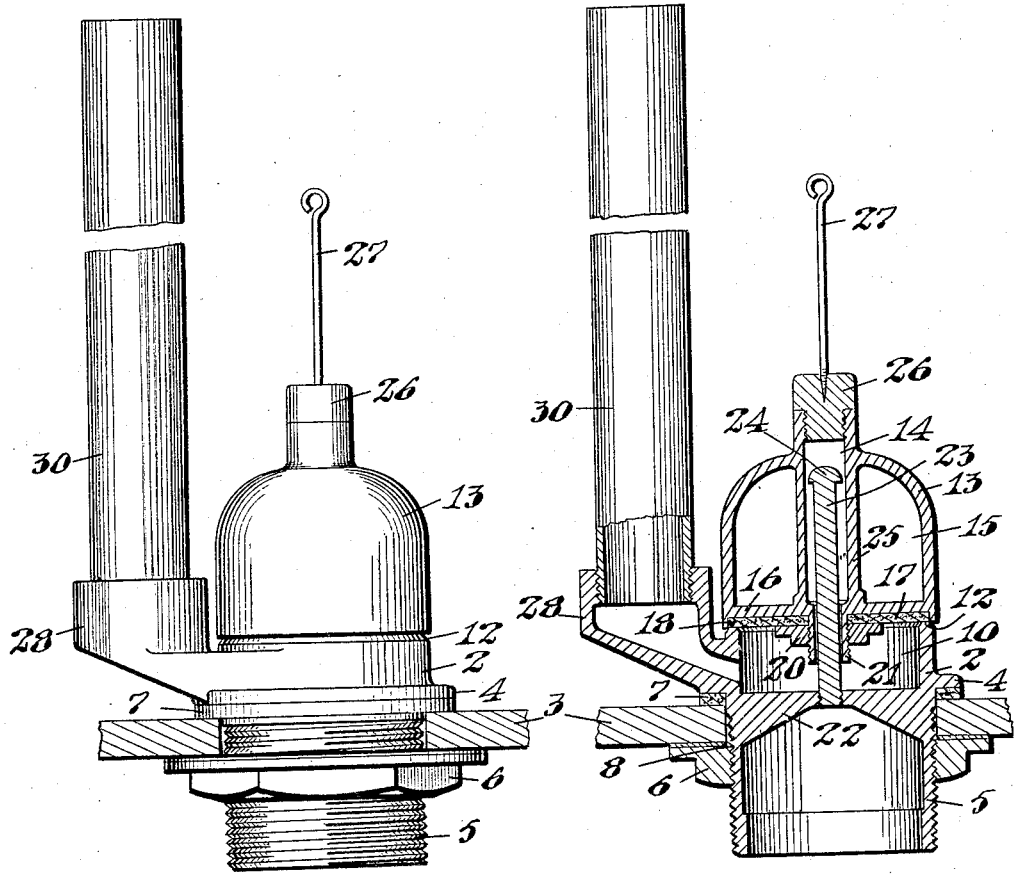

Jan. 31, 1933.      A. T. COBB      1,895,786

FLUSH VALVE

Filed March 5, 1931

INVENTOR
Arthur T. Cobb,
By J.H. McCready
his Attorney.

Patented Jan. 31, 1933

1,895,786

UNITED STATES PATENT OFFICE

ARTHUR T. COBB, OF EXETER, NEW HAMPSHIRE, ASSIGNOR TO EXETER BRASS WORKS, OF EXETER, NEW HAMPSHIRE, A CORPORATION OF NEW HAMPSHIRE

FLUSH VALVE

Application filed March 5, 1931. Serial No. 520,247.

This invention relates to flush valves for water closet tanks.

It aims to devise an article of this character which can be manufactured very economically while at the same time providing an exceptionally reliable valve.

The nature of the invention will be readily understood from the following description when read in connection with the accompanying drawing, and the novel features will be particularly pointed out in the appended claims.

In the drawing,

Figure 1 is a side view of a valve constructed in accordance with this invention; and Fig. 2 is a vertical, sectional view of the valve shown in Fig. 1.

The construction shown comprises a valve body 2 adapted to be secured to the bottom 3 of a water closet tank. For this purpose it is provided with a flange 4 to rest on the upper surface of the tank and also with a screw threaded shank or spud 5 to extend through a hole in the bottom of the tank, a nut 6 being threaded on the shank 5 to clamp the valve body securely to the tank bottom 3. A gasket 7 and washer 8 usually are interposed between the bottom of the tank and the flange 4 and nut 6, respectively.

A straight upright outlet 10 is formed through the valve body 2 for the discharge of the water and a valve seat 12 surrounds this outlet at the upper end of the valve body, the valve seat being formed on the edge of a short upright cylindrical extension of said body. The movable element of the valve consists of a float 13 provided with an air chamber 15 and preferably made of hard rubber, vulcanite, bakelite, or some other moldable material. The lower end face of the float is recessed and is made flat as shown at 16, Fig. 2, to receive a valve washer 17 of fibre, leather, or other suitable material, which engages the valve seat 12, the edge of this washer being supported against spreading by the annular flange 18. A nut 20 which is threaded on the tubular stem 21 projecting downwardly from the float holds the washer 17 in place.

In order to guide the float 13 for movement toward and from the valve seat 12 the float has a central bore 14 formed axially therethrough, separate from the surrounding air chamber in the float, and the valve body 2 is provided with a spider 22 in which a post or rod 23 is rigidly supported. This rod extends into the bore 14 and is made slightly smaller in diameter than the internal diameter of the lower section of the bore where it passes through the nipple 21 so that the float can slide freely on the rod. At its upper end the rod is provided with an enlargement or head 24 which is adapted to engage the shoulder 25 at the junction of the larger upper section of this bore with the reduced lower section of it to limit the upward movement of the float away from the valve seat. A plug 26 is screw threaded into the upper end of the bore 14 where it closes the bore and also forms a convenient anchorage for the hook or eye 27 provided for the purpose of connecting the float with the chain or other operating element used to lift the float.

The valve body 2 has a hollow enlargement 28 extending from one side thereof which is internally threaded or tapped to receive the lower end of an overflow pipe 30, and the channel formed in this extension is inclined downwardly and opens into the outlet 10. Consequently, if the level of the water in the tank rises too high, it finds a very free outlet or passage through the overflow pipe 30 and valve body to the hopper or seat.

When this device is in use the float 13 normally is held by the pressure of the surrounding water in substantially the position in which it is shown in Fig. 2 where it prevents any flow of water through the outlet. To flush the hopper or seat the float is lifted by any suitable operating mechanism and the water in the tank then flows freely through the outlet 10. As the level of water in the tank drops, the float 13 drops with it until its lower end is only a short distance from the valve seat, at which time the float is caught by the outward rush of water and is pulled down into its closed position.

The device has proved to be exceptionally reliable in practice, it can be manufactured and assembled very economically and the nature of the construction is such that if repairs are necessary they can be made very easily.

While I have herein shown and described a preferred embodiment of my invention, it will be understood that the invention may be embodied in other forms without departing from the spirit or scope thereof.

Having thus described my invention, what I desire to claim as new is:

1. A flush valve for water closets comprising a valve body having a straight outlet passage therethrough and provided with a hollow lateral threaded extension having a downwardly inclined channel leading from the threaded portion thereof into said outlet, a valve seat at the upper side of said body surrounding said outlet, a float forming the movable element of said valve and having a flat face on its lower side, a valve washer supported on said face, means for securing said washer in place, said float having a central bore therein and a closed annular air chamber surrounding said bore and separated from said bore, the bore being provided with an internal shoulder, a rod rigidly supported in said valve body and extending into said bore in the float, said rod serving to guide the float as the float is moved toward and from said seat and having a head positioned in said float to engage said shoulder and thereby limit the movement of said float away from said seat, and means fastened to the upper end of said float for lifting the float.

2. A flush valve for water closets comprising a valve body having a discharge outlet extending therethrough and surrounded by an upright cylindrical extension of said body, a valve seat on the upper edge of said extension, a float forming the movable element of the valve and having a flat bottomed recess to register with said valve seat, said float having an upright central bore surrounded by a closed annular air chamber separated from said bore and also having a tubular stem projecting from the lower side of the float, the hole in said stem forming a part of said bore, a nut threaded on said stem for clamping a washer against said flat bottom of the float, an upright stationary guide rod rigidly supported by said valve body and extending into the bore in said float to guide the float as it is moved toward and from said seat, said bore having an internal shoulder and said rod having a head in said bore to engage said shoulder and limit the movement of the float away from said seat, a plug closing the upper end of the bore in said float, and means fastened to said plug for lifting said float.

ARTHUR T. COBB.